May 20, 1930.  H. J. EDWARDS  1,759,445
SLEEVE VALVE
Filed June 19, 1929
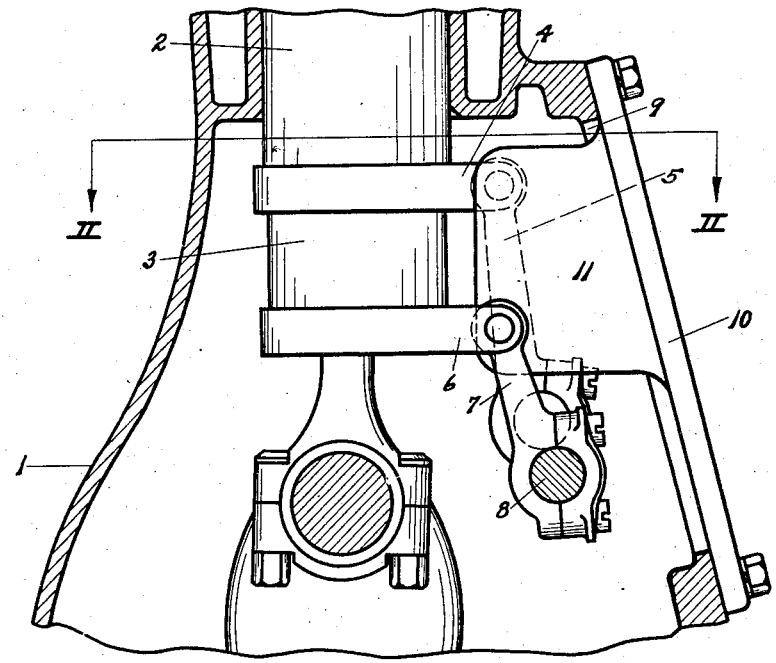
Fig. I.
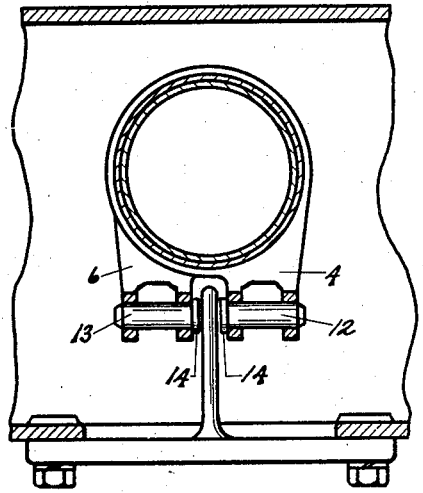
Fig. II.
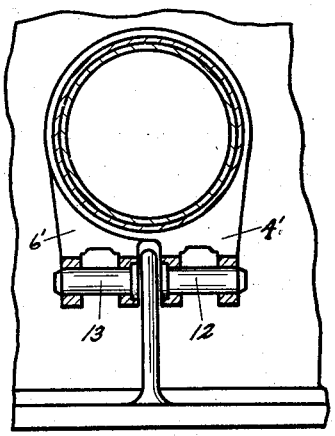
Fig. III.
INVENTOR.
HENRY J. EDWARDS.
BY Warren T. Hunt
ATTORNEY.

Patented May 20, 1930

1,759,445

UNITED STATES PATENT OFFICE

HENRY J. EDWARDS, OF TOLEDO, OHIO, ASSIGNOR TO THE WILLYS-OVERLAND COMPANY, OF TOLEDO, OHIO, A CORPORATION OF OHIO

SLEEVE VALVE

Application filed June 19, 1929. Serial No. 372,009.

My invention relates to sleeve valves for internal combustion engines and more particularly to means for locking the connecting rod pins of the sleeves in position.

One object of the invention is to provide a locking means which is necessarily placed in operative position when the cover is bolted to the crank case.

Another object is to provide a lock which will positively prevent accidental displacement of the pin when in assembled position and will permit the same to be readily removed without the use of special tools when the crank case cover is removed.

In the drawings, Figure I is a vertical section through a sleeve valve motor showing application of the invention to the sleeve connecting rod pins.

Fig. II is a section taken along the line II—II of Figure I.

Fig. III is a section similar to Fig. II showing a slight modification.

Referring to Figs. I and II, I have shown a sleeve valve engine including a crank case and telescoping sleeve valves 2 and 3. The sleeve 2 is provided with a lug 4 for attachment to the connecting rod 5. The sleeve 3 is provided with a similar lug 6 for attachment to the connecting rod 7. The connecting rods 5 and 7 are mounted on the eccentric shaft 8 and serve to reciprocate the sleeves. An opening 9 is formed in the crank case adjacent the eccentric shaft and the sleeve connecting rods. A plate 10 is bolted over this opening and projecting from the inner side of plate 10 is a locking plate 11 which extends between the connecting rods 5 and 7 and their respective sleeve lugs. The lugs 4 and 6 are attached to the connecting rods by means of pins 12 and 13 respectively. Each pin is provided with a head 14 and the pins are inserted through the lugs and connecting rods with the headed ends turned inwardly towards each other. When cover plate 10 is bolted in position, the locking plate 11 extends between the lugs of the sleeves so that the pins cannot be accidently displaced, it being obvious that the heads 14 prevent displacement of the pins outwardly. When the cover plate is removed for the purpose of making repairs or the like, the pins can be readily slipped from their position without the use of any special tools. When the work is finished and the cover plate is replaced, the pins will again be locked in position as securely as when the motor was first assembled.

The construction shown in Fig. III is the same as that previously described, except that the holes in the lugs 4' and 6' are countersunk, so that the heads of the pins are flush with the inner sides of the lugs.

While I have described a specific embodiment of my invention, it will be understood that the invention is not limited to the details shown, except in so far as such details are included in the claims.

I claim:

1. In a sleeve valve internal combustion engine an assembly comprising a sleeve having an apertured lug projecting therefrom, a connecting rod for reciprocating said sleeve, and a pin extending through said connecting rod and said lug; means for preventing displacement of said pin in one direction, and means independent of said assembly adapted to be positioned adjacent said pin for preventing displacement of said pin in the opposite direction.

2. In combination, a casing having an opening therein, two moving members within said casing having aligned apertures, a pin extending through said aligned apertures for connecting said members together, means for preventing displacement of said pin in one direction, and a plate removably secured over said opening and including means positioned adjacent an end of said pin to prevent displacement thereof in the opposite direction.

3. In combination, a crank case having an opening therein, a pair of reciprocating members within said crank case having aligned apertures, a headed pin extending through said aligned apertures, a plate removably secured over said opening, and means on said plate positioned adjacent the headed end of said pin to prevent displacement thereof.

4. In combination, a casing having an opening, two moving assemblies within said casing, each including a headed pin for connecting parts thereof together, said pins moving in spaced parallel planes with their headed ends projecting towards each other, a plate removably secured over said opening and including means positioned between the headed ends of said pins to prevent displacement thereof.

5. In combination, a casing having an opening therein, two assemblies reciprocating in spaced parallel planes within said casing, each including a headed pin for connecting parts thereof together, a plate removably secured over the opening in said casing and including means positioned between the headed ends of said pins to prevent displacement thereof.

6. In a sleeve valve internal combustion engine, a crank case having an opening therein, a pair of reciprocating sleeves, each provided with an apertured lug, said lugs lying in laterally spaced vertical planes, a headed pin extending through the lug of each sleeve for securing a connecting rod thereto, the headed ends of said pins projecting toward each other, a plate removably secured over the opening in said crank case and inwardly projecting means on said plate extending between the headed ends of said pins to prevent displacement thereof.

7. A combination cover and sleeve pin locking plate for a sleeve valve engine, comprising a cover portion and a sleeve pin locking plate portion projecting therefrom, said locking portion being adapted to normally project into the engine case.

In testimony whereof, I affix my signature.

HENRY J. EDWARDS.